United States Patent [19]

Zheng

[11] Patent Number: 5,638,476

[45] Date of Patent: Jun. 10, 1997

[54] CONTROLLED SPLICING OF OPTICAL FIBERS

[75] Inventor: Wenxin Zheng, Solna, Sweden

[73] Assignee: Telefonaktiebolaget LM Ericsson, Stockholm, Sweden

[21] Appl. No.: 400,968

[22] Filed: Mar. 8, 1995

[30] Foreign Application Priority Data

Mar. 8, 1994 [SE] Sweden ................................. 9400781

[51] Int. Cl.$^6$ .................................................. G02B 6/255
[52] U.S. Cl. ........................... 385/96; 385/95; 385/97; 385/98; 219/121.11; 219/121.14
[58] Field of Search .......................... 385/96, 95, 97, 385/98, 99; 219/121.11, 121.12, 121.13, 121.14

[56] References Cited

U.S. PATENT DOCUMENTS

| | | | |
|---|---|---|---|
| 4,557,556 | 12/1985 | Decker, Jr. ........................... | 385/140 |
| 5,002,351 | 3/1991 | Szanto et al. ........................ | 385/96 |
| 5,013,345 | 5/1991 | Itoh et al. ............................. | 65/4.2 |
| 5,046,813 | 9/1991 | Itoh et al. ............................. | 385/96 |
| 5,170,456 | 12/1992 | Itoh et al. ............................. | 385/96 |

FOREIGN PATENT DOCUMENTS

| | | |
|---|---|---|
| 504 519 | 9/1992 | European Pat. Off. . |
| 37 24 914 | 2/1989 | Germany . |
| 40 25 351 | 2/1992 | Germany . |
| 63-106706 | 5/1988 | Japan . |
| 2-6908 | 11/1990 | Japan . |
| 9100979-5 | 10/1992 | Sweden . |
| 9100978 | 10/1992 | Sweden . |
| 9201235-0 | 10/1993 | Sweden . |
| 9201818-3 | 12/1993 | Sweden . |
| 9201817-5 | 12/1993 | Sweden . |
| 9300522-1 | 8/1994 | Sweden . |
| 2 201 529 | 9/1988 | United Kingdom . |

OTHER PUBLICATIONS

I. Yokohama et al., "Fiber-Coupler Fabrication with Automatic Fusion-Elongation Processes for Low Excess Loss and High Coupling-Ratio Accuracy," *IEEE Journal of Lightwave Technology*, vol. LT-5, No. 7, pp. 910–915 (Jul. 1987).

*Primary Examiner*—Phan T. H. Palmer
*Attorney, Agent, or Firm*—Burns, Doane, Swecker & Mathis, L.L.P.

[57] ABSTRACT

In splicing two optical fibers in the common way, the end surfaces of the fibers are placed opposite each other and then the fiber ends are melt-fusioned using an electric arc generated between two electrodes. In order to obtain a predetermined lateral displacement of the outer surfaces of the fibers, the fiber ends are placed in positions with a displacement exceeding the desired displacement before the fusion melting. During fusion welding, an electric current of a large intensity is passed between the electrodes, and the first-set lateral displacement will decrease due to surface tension. After the fusion melting, the electric arc is continued at a reduced intensity which also produces a lower temperature in the region at the splice of the fiber ends. At this stage, the outer surfaces of the fiber ends are observed, which then become more and more aligned with each other (that is, the lateral displacement decreases) due to the surface tension. The electric arc is discontinued at a suitable time such that the desired lateral displacement is obtained after cooling.

6 Claims, 6 Drawing Sheets

CONTROLLED SPLICING OF OPTICAL FIBERS

TECHNICAL FIELD

This invention relates to a method and a device for splicing, in a controlled way, two optical fibers.

BACKGROUND

In the rapid development nowadays of optical fibers and fiber components in the world more and more complicated optical fiber systems are utilized for use in the technical fields of communication and sensing. In some such advanced systems it would be advantageous if a fusioned fiber splice could be made in situ to be built into an optical fiber line and if the splice could be given a predetermined lateral offset of the fiber end claddings or of the cores of the spliced optical fiber ends. Such an offset in the splice is necessary for e.g. splicing optical fibers having strongly eccentrically located fiber cores with an alignment of the cores for giving a splice having a low attenuation, for producing in situ, from optical fibers of the standard type used for communication, attenuation elements having a predetermined, small reflective capability, splicing an optical D-fiber to a conventional cylindrical optical fiber, splicing conventional optical fibers having a single core to optical fibers having double cores, etc.

There are many methods of producing a fusioned or welded splice of two optical fibers such that in the splice there is a lateral offset, as seen perpendicularly to the longitudinal direction of the fibers, of the exterior surfaces of the claddings of the fibers. However, there exists a significant difficulty in controlling or regulating the offset, so that it achieves a desired value with a good accuracy, since the surface tension effect during the melted condition in the splicing region, which exists during the fusion welding, tends to reduce every lateral offset between the exterior surfaces of the fiber claddings. The tensile velocity, which acts in the transverse direction of the fibers and is caused by the surface tension, is a function of temperature of the material in the splicing region and of the lateral offset of the fiber claddings, so that for instance for a very small offset the tensile velocity is very small or even quite negligible. Further, since the temperature in the splicing region depends on various exterior conditions such as, for conventional melt-fusioning by means of an electric arc generated between two welding electrodes, the state of the electrodes, the current through the electrodes during the melt-fusioning, the pressure of the ambient air, etc., it is impossible to maintain the temperature constant from one welding occasion to another. Thereby the lateral offset of the fiber claddings after the fusion welding will also vary, although the same time and current are used for the fusion welding. Further, an additional effect is that the larger the offset of the fiber claddings, the larger is the above mentioned restoring velocity or the velocity, with which the surface tension tries to reduce the offset of the exterior surfaces of the fiber claddings to a value near zero.

In order to control the offset of the fiber cores during the welding of two optical fibers of conventional type a real-time-control based on image processing of a picture taken thereof in the heated fiber ends was developed, see the Swedish Patent Application No. 9201235-0, filed Apr. 16, 1992. In order that it will be possible to use such a picture and in particular that it will be possible to distinguish therein the core/cores of a fiber or fibers, the heating temperature, which for electric arc welding corresponds to or depends on the current through the electrodes, must have a sufficiently high value, so that for instance for quartz standard fibers of type single mode widely used for communication and having cladding diameters of 125 μm the welding current must be larger than 13 mA. This method can work well when the desired offset of the fiber cores is smaller than 2 μm, since then the restoring tensile velocity in the transverse direction of the fibers is very low. However, the larger the offset of the fiber cores, the larger is the restoring tensile velocity depending on the surface tension and this effect is in particular observable during the rather high currents, which are required for taking such a picture of a heated fiber or of heated fiber ends. When the offset of the fiber claddings is larger than 2 μm and when a welding current, which is sufficiently large in order that such a warm fiber picture should be obtained, is applied during the short heating times, of about 0.3 seconds, which are used according to the previous method mentioned above, a large reduction of the lateral offset of the exterior surface of the fiber claddings is obtained, in the normal case more than 0.8 μm for each such period of pulsed heating. This reduction can even exceed 1 μm for an initial lateral offset of the exterior surfaces of the fiber claddings comprising 8 μm. It makes the accuracy of the final offset of the fiber claddings very low in this case, i.e. the resolution of our previous real-time-control based only on pictures obtained of heated fiber ends can be so bad as 0.8 μm to 1.0 μm, when the lateral offset between the exterior surfaces of the fiber end claddings is larger than 2.0 μm. This resolution of the real-time-control can generally be defined as the distance, by which the lateral offset of the exterior surfaces of the fiber claddings is changed, during the time period, which is required for taking and analyzing a picture and which can have the magnitude of order 0.3 to 0.5 seconds.

The picture, which is used in the previously developed method, is, as has been already indicated, a warm fiber picture, i.e. a picture of a fiber, which is not illuminated by any light source from the exterior but only emits light depending on the rather high temperature, to which it is heated, in the standard case by an electric arc. In order to obtain such a usable warm fiber picture, where material inhomogeneities and in particular the fiber cores are distinguishable, the heating temperature must be rather high, as has been mentioned already. The picture which is obtained of a fiber or of fiber ends in a cold state, here called a cold fiber picture, is a picture of a fiber, which is illuminated by means of some exterior light source from a side of the fiber, generally perpendicularly to the longitudinal direction thereof, and is observed on the opposite side of the fiber. In such a picture, generally the fiber cores are not distinguishable, unless special, costly constructed optical systems having for instance highly resolving lenses are used.

Relevant prior art within the fiber splicing technique appears from among other sources the Swedish Patent Applications Nos. SE-A 9100979-5, 9100978-7, 9201817-5 and 9201818-3. Pulsed heating of splices is used in the method disclosed in JP-A 2-6908 where the external diameter and axial shifts of five parallel fiber splices are monitored.

SUMMARY

It is an object of the invention to provide a method and a device for controlling, during a splicing procedure or in a splice between two ends of optical fibers, the lateral offset or the offset perpendicular to the longitudinal direction in the splice of the claddings of the two fiber ends.

It is a further object of the invention to provide a method and a device whereby a splice can be obtained between two ends of optical fibers, having a predetermined and controlled attenuation of a light wave transmitted through the spliced optical fiber.

It is a further object of the invention to provide methods and devices of the kind mentioned above, which can be applied in or built into available splicing machines.

The mentioned objects are achieved by the invention, the more detailed characteristics of which are set out in the appended claims.

Two optical fibers are spliced or connected by means of fusion welding in the principally conventional manner and then first the end surfaces of the fibers are placed opposite each other with the longitudinal directions of the fiber ends parallel to each other and very close to, engaging or almost engaging, each other. The end regions adjacent to the end surfaces are then heated, until the material in the fibers adjacent to the end surfaces is melted and the melt-fusioning of the ends of the two fibers has been achieved. The end surfaces of the fibers are before the actual melting stage placed with a lateral offset of the fiber ends, so that, as seen in a selected direction substantially perpendicular to the longitudinal direction of the ends, the exterior sides of the ends deviate from being aligned with each other by a predetermined initial value. Immediately after the step of the fusioning which includes an application of heat having a high intensity, the application of heat is continued with a lower intensity, which is not sufficient for forming a fusioned splice. During this continued application of heat the fiber ends are observed, as viewed in the selected direction, and the value is determined, by which the exterior sides of the ends deviate from being aligned with each other. The application of heat is then discontinued, when the determined value is lower than a predetermined final value, which then is smaller than the predetermined initial value.

By means of the offset exterior surfaces and thus offset cores in a produced splice attenuation elements can be produced having an attenuation of e.g. between 0.3 dB and 10 dB.

BRIEF DESCRIPTION OF THE DRAWINGS

The invention will now be described in more detail with reference to non-limiting embodiments and with reference to the accompanying drawings, in which.

DETAILED DESCRIPTION

Figure 1:
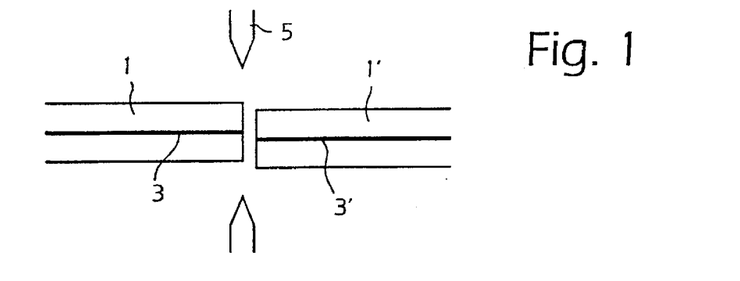
FIGS. 1–5 schematically show the ends of two fibers during different steps of splices up to a finished splice in FIG. 5, FIGS. 6a and 6b show photographs of a splice obtained of optical standard fibers and having a lateral offset.
Figure 2:
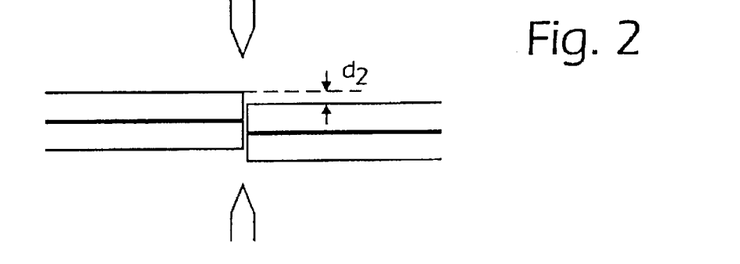
Figure 3:
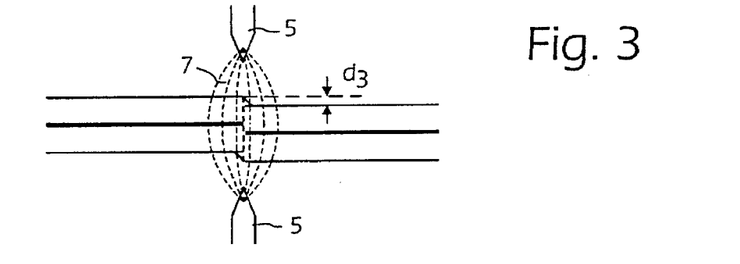
Figure 4:
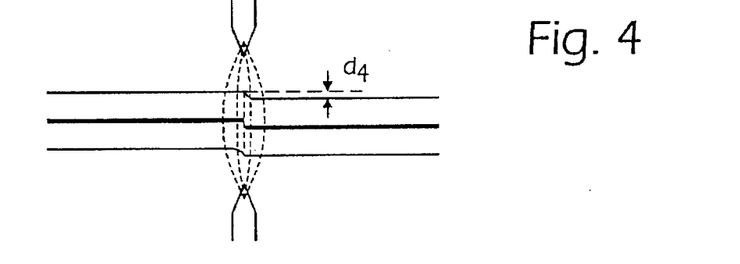
Figure 5:
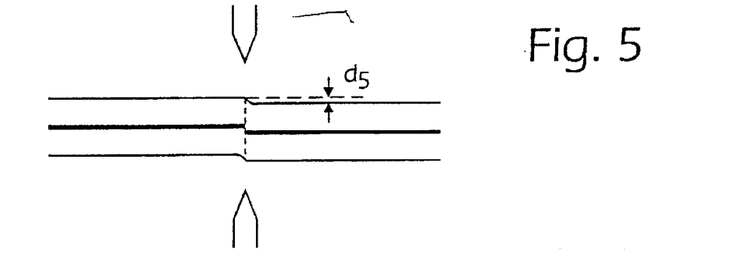

In FIGS. 1–5 different steps in fusion welding ends of two optical fibers 1 and 1' are illustrated as seen from the side of the fibers. In the start position as shown in FIG. 1 the fiber ends are placed having their longitudinal directions parallel to each other and their end surfaces, which are substantially perpendicular to the longitudinal direction of the fiber ends, at a small distance from each other. Then the ends of the fibers are displaced in relation to each other in the longitudinal direction of the fibers to the position shown in FIG. 2, so that the end surfaces of the fiber ends are located in engagement or almost engagement with each other or very close to each other and so that a lateral offset $d_2$, thus an offset perpendicular to the longitudinal direction of the fibers, exists between the exterior surfaces of the fiber ends. The exterior surfaces are generally for standard fibers a circular cylindrical exterior surface of the cladding of the fibers. Then a high voltage is applied between welding electrodes 5, so that an electric arc 7 is formed between the points of the electrodes 5. The electric arc 7 then encloses a region at the ends of the fibers 1, 1'. This region is then heated so much, that the two optical fibers 1 and 1' are welded to each other at their end surfaces, which are placed at each other. Then an offset $d_3$ of the exterior surfaces of the two fiber ends is obtained, which due to the surface tension in the melted region is smaller than the previous lateral offset $d_2$. The heating effect from the electric arc 7 is then reduced, by the method that a smaller welding current is allowed to pass between the electrodes 5. Then the fiber ends are displaced even more to be aligned with each other, so that their exterior surfaces will better and better connect to each other. An offset $d_4$ of the exterior surfaces of the fibers is obtained, which successively decreases from the former value $d_3$. The heating by means of the electric arc 7 is then completely interrupted, when a desired offset $d_{set}$ is achieved and the fiber is allowed to cool and the remaining offset d is then $d_5$ of the exterior surfaces of the previous fiber ends, as is illustrated in FIG. 5.

Figure 6A:
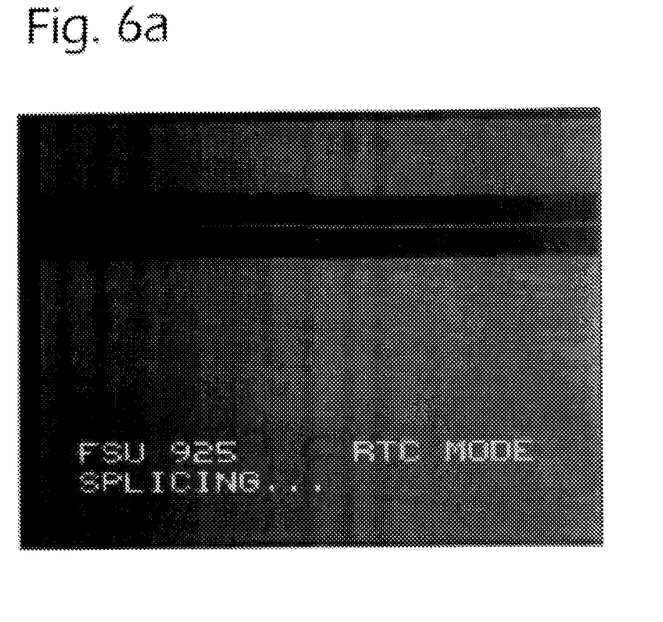
Figure 6B:
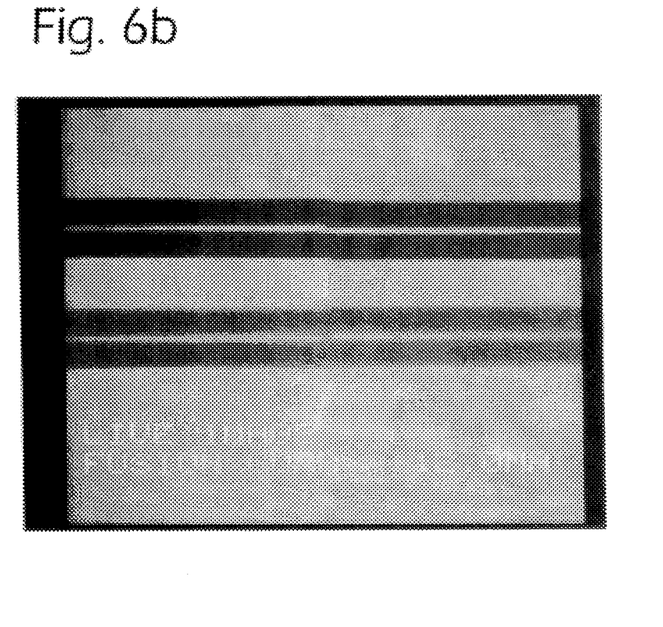

In FIGS. 6a and 6b, respectively, pictures are illustrated, as taken in the process according to the description above, by means of the optical system in an automatic fiber welding machine of type FSU 925 manufactured by Ericsson Cables AB, where the system is set for giving a picture of the whole splicing region. In FIG. 6a thus the fiber splice is shown as seen in one direction during the proper splicing process while in FIG. 6b the fiber splice is visible in two observation directions perpendicular to each other during that phase of the procedure when a lower amount of heat than during the welding is applied, in order to give the desired lateral offset.

Figure 7A:
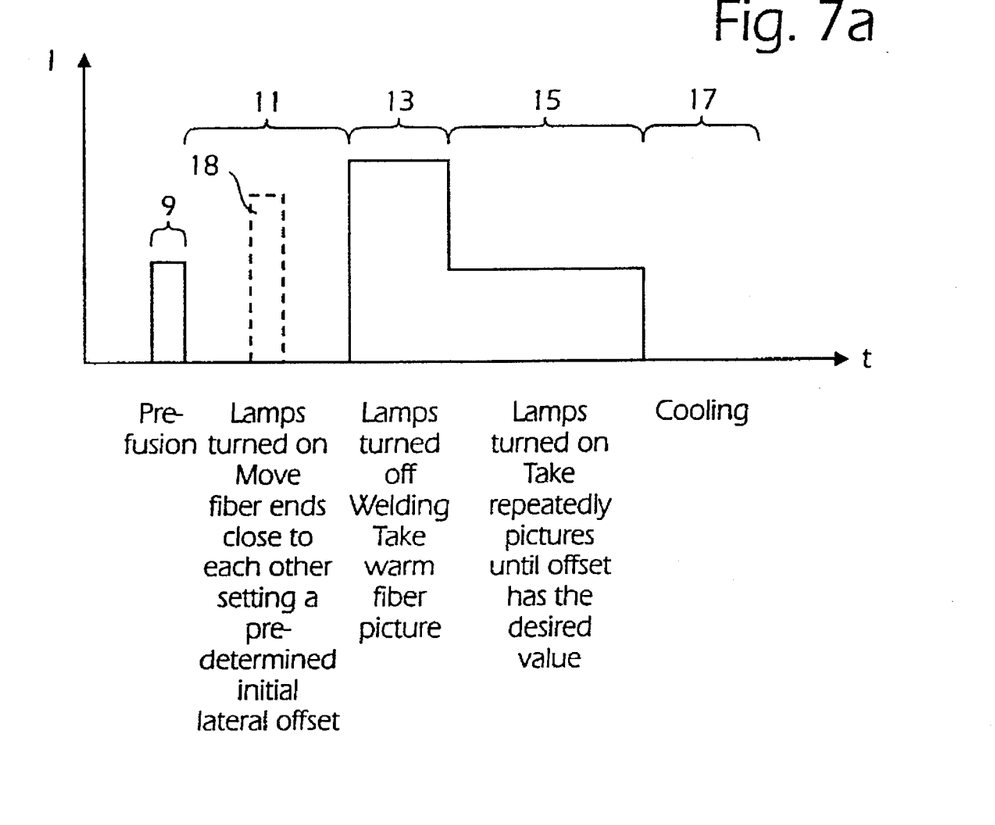
FIG. 7a is a diagram of the current through electrodes, which are used in the fusioning, as a function of time.

The electric current I between the welding electrodes 5 is plotted as a function of time in the diagram of FIG. 7a. Here it is also shown, that to the electrodes a voltage is provided, during a preparation time period at 9 for a prefusion of the surfaces of the ends of the optical fibers for removal of dirt particles. After that an alignment step 11 follows without an arc and without welding current, which corresponds to the steps of the FIGS. 1 and 2. During the melt-fusioning step 13, which corresponds to the process of FIG. 3, a rather high welding current is applied, the end surfaces of the optical fibers 1 and 1' then being melt-fusioned. Also, during this stage the fiber cores 3, 3' in the optical fibers 1 and 1', respectively, can be observed by means of the radiation, which during the intense heating is emitted by the fiber ends. During the next stage 15 the fiber ends and in particular their exterior sides are continuously observed during the application of a lower welding current, which is so low that the fiber cores cannot easily be observed in the direct emission from the heated portion of the fiber ends. Finally, the splicing process is finished and the welding current is switched off, which corresponds to FIG. 5 and the time period 17 in FIG. 7a. At 18 a possible heating step during the initial alignment process is shown, this heating allowing that a warm fiber picture is obtained from which the position of the fiber cores in relation to the exterior sides of the fibers can be determined.

Figure 7B:
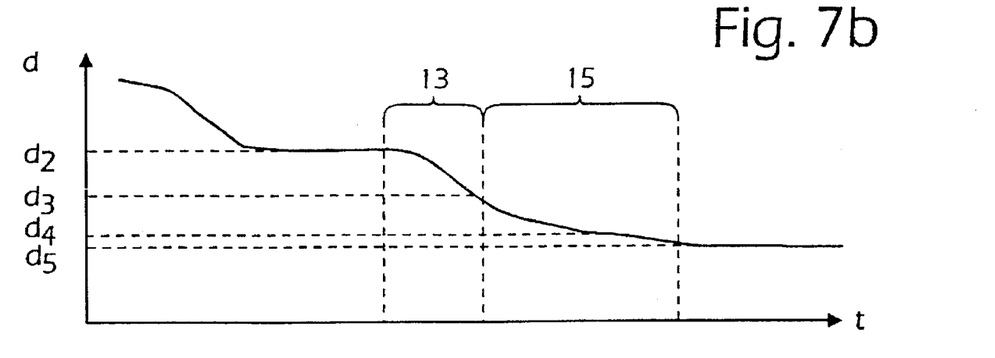
FIG. 7b is a diagram showing the lateral offset as a function of time during the fusioning, FIG. 8 schematically shows the optical principal components in a device used in splicing optical fibers, FIG. 9 schematically shows the electronic principal components in a device used in splicing optical fibers.

In FIG. 7b a diagram of the corresponding lateral offset d of the fiber ends as a function of time is illustrated. As has been discussed above, there is first a start alignment step, 11 in FIG. 7a, when the fiber ends are given an initial value of their lateral offset of each other. This offset then decreases with a varying velocity thereafter, first more rapidly during the proper welding period 13 and then more slowly during the step 15, when the desired offset is produced by determining repeatedly all the time the present offset, and the heating is switched off, when, considering the small extra offset, which is obtained when the splice cools, the offset ($d_5$) obtained thereafter as accurately as possible corresponds to the desired offset ($d_{set}$).

Figure 8:
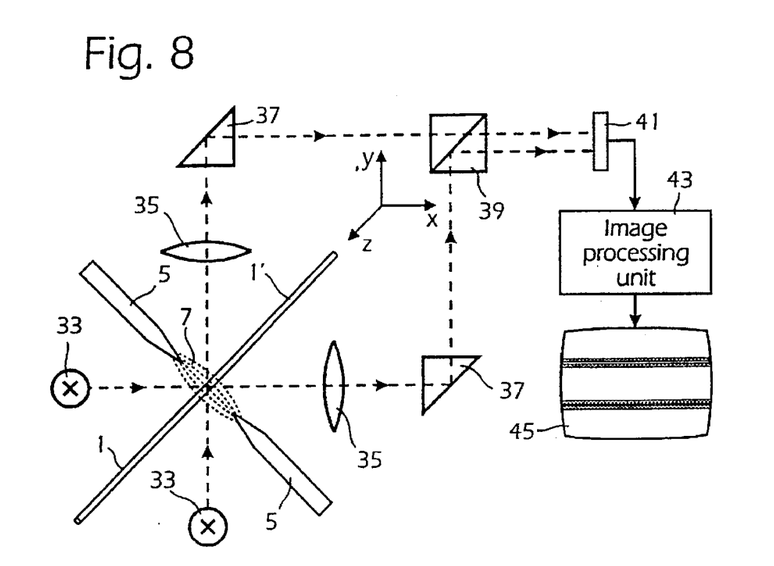
Figure 9:
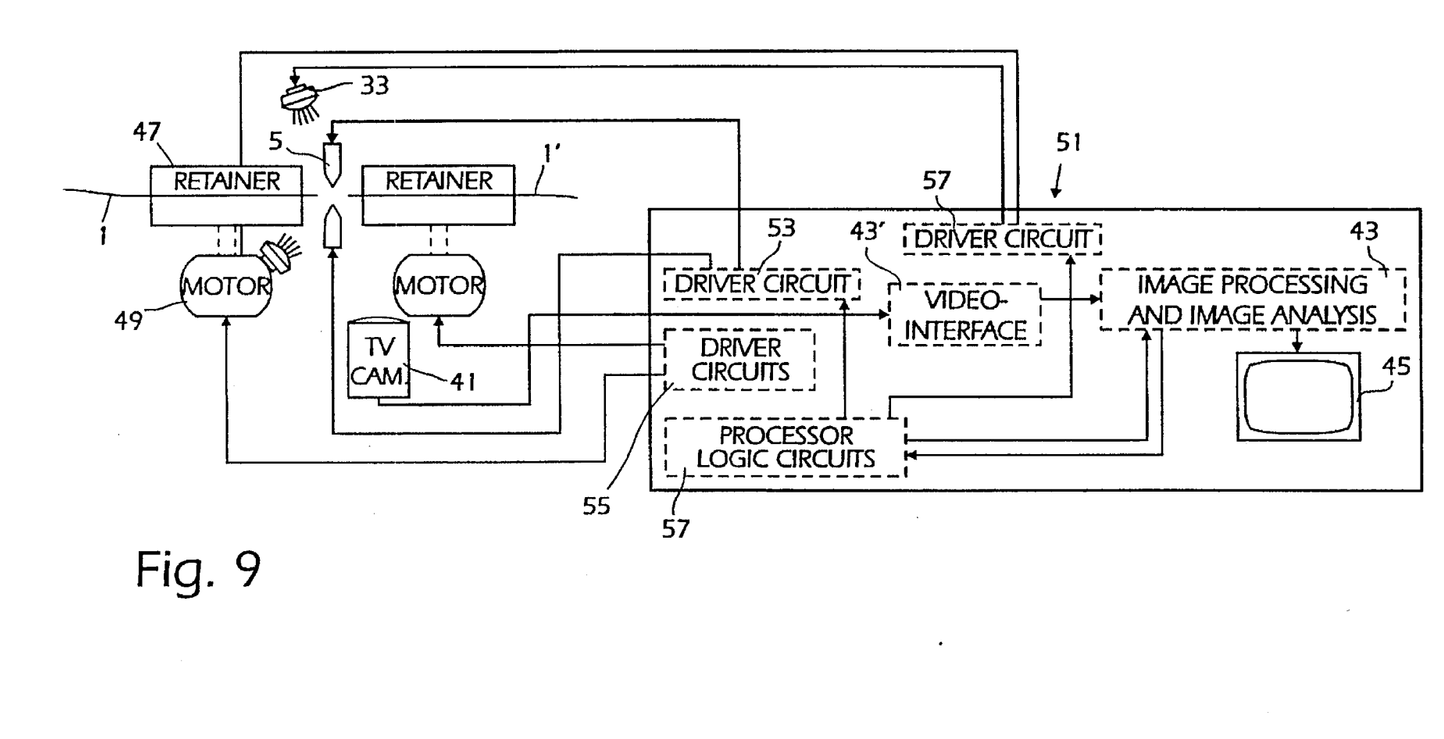

The procedure described above is advantageously performed by means of an automatic image processing and positioning device, the optical components of which are schematically illustrated in FIG. 8 and the electronic components of which are illustrated in FIG. 9. During the stage 11, thus pictures are automatically taken, which are analyzed continuously. The result of the analysis controls the automatic positioning device in order that the fiber ends will be positioned having the correct initial offset of the lateral surfaces and with the end surfaces quite close to each other. During the fusion-welding step 13, instead the exterior illumination is switched off and only a warm fiber picture, which is obtained from the light emitted from the welded splice region, is taken and analyzed. From this picture, e.g. the positions of the fiber cores 3 and 3' can be determined with a relatively good accuracy in relation to the exterior surfaces of the respective fiber. During the stage 15 no or insufficient light is emitted from the welded splice region and then the exterior illumination is switched on. The automatic image analysis device determines the position of the exterior surfaces (can also be called the position of the sides) in relation to each other of the fiber ends, an offset $d_4$, which gradually decreases continuously, being analyzed or being determined. When the analysis device finds a predetermined value of this offset $d_4$, the electrode voltage is switched off, whereby the heating ceases. During a small remaining time up to after the cooling the offset is reduced further to the value $d_5$.

Finally, with the exterior illumination switched off, the final offset $d_5$ of the exterior surfaces of the two fiber ends is determined.

For optical standard fibers of single mode type warm fiber pictures can be obtained, from which the position of the core can be determined in relation to the exterior surfaces of the fiber, by means of welding currents of at least 13 mA. For currents below this value, still a melting of the fiber region is obtained and a smoothing influence of the surface tension, so that the exterior surfaces of the two fiber ends tend to be aligned with each other. For a such a lower welding current still some light can be emitted but it does not disturb the exterior illumination, so that the position of the exterior surfaces of the fibers can easily be distinguished and determined.

In the optical system which is schematically illustrated in FIG. 8 two light sources 33 are arranged which illuminate the splicing position between the two fibers 1 and 1' in two directions perpendicular to each other and also perpendicularly to the longitudinal direction of the fiber ends. The light from the light sources 33 is focused or parallelized by means of lenses 35, after which the light rays are deflected perpendicularly by reflecting elements 37 and is caused to hit a beam splitter 39 which in this case is used invertedly in order to collect the two light beams obtained from the perpendicular directions to the same TV camera or CCD-camera 41 comprising an area or surface having light sensitive elements. From the TV-camera 41 the generated video signal is delivered to an image processing unit 43, by means of which the pictures can be shown on a monitor or display element 45. A picture will then show the splicing position between the fiber ends as viewed in the two perpendicular directions and positioned above each other, compare FIG. 6b.

In the schematic picture of FIG. 9 of a fiber splicing device of the automatic type retainers 47 are shown, in which the ends of the fibers 1, 1' are placed and are retained during the positioning and the splicing. The retainers are movable in three orthogonal coordinate directions both in parallel to the longitudinal direction of the fibers and in two directions perpendicular to this direction which then also are perpendicular to the illuminating directions from the light sources 33. The retainers 47 are thus operated along suitable mechanical guides, not shown, by control motors 49. Electric lines to the electrodes 5 and the motors 49 and the lamps 33 are provided from an electronic circuit module 51 and from driver circuits 53, 55 and 57 respectively. From the TV camera 41 an electric line is arranged to a video interface 43' in the electronic circuit module 51, from which a suitable image signal is delivered to the image processing and image analysis unit 43, compare FIG. 8. The various procedural steps are controlled by a control circuit 57, e.g. in the shape of a suitable micro processor. The control circuit 57 performs the procedural steps mentioned above and thus controls the displacement of the fiber ends in relation to each other by energizing the motors 49 in suitable displacement directions, provides a signal to the image processing and image analysis unit 43 for starting an analysis of an obtained picture and a determination of the offset, as is observed in the two directions perpendicular to each other. Further, the control circuit 57 controls the activation of the light sources 33 and the time, when a fusion current is to be started to be provided to the electrodes 5 and the time period during which this high splicing current is to be delivered and also the regulating current for a controlled monitoring of the offset between the exterior surface of the fiber ends by providing a lower splicing or electrode current.

Figure 10:
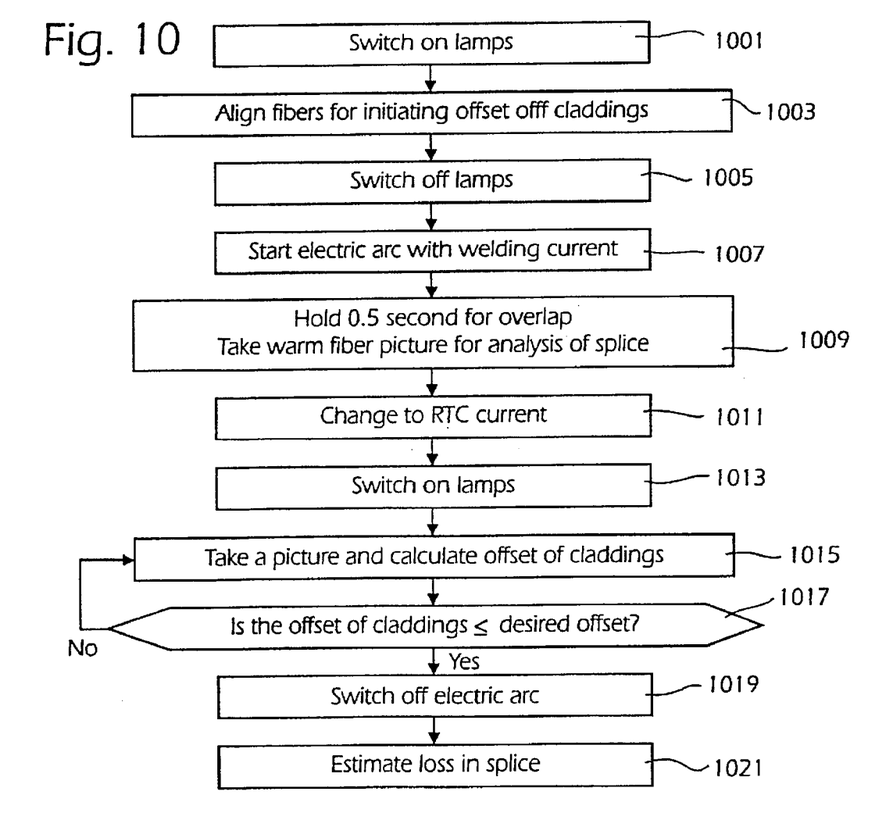
FIG. 10 is a flow diagram of the splicing process.

The flow diagram of FIG. 10 illustrates the different steps which are executed by the control circuit 57. In a first step 1001 the two lamps 33 are switched on and then the fiber ends are aligned in a step 1003 to a predetermined lateral offset of the exterior surfaces of the claddings of the fiber ends. During this stage pictures are continuously taken of the region at the fiber ends, which are analyzed, and from the result of the analysis suitable control signals are generated to the positioning motors 49. When the desired initial offset has been achieved, the exterior illumination is switched off in a step 1005 and then in a step 1007 a current having a suitably high value for the fusion welding starts to be applied to the electrodes 5. This high current is maintained in the step 1009 during 0.5 seconds in order that the material in the splice will have time to be melt fusioned together and during this stage a picture of the fiber splice is taken, from which the positions of the fiber cores appear. After that, in a step 1011 the current is changed to a lower value, the exterior illumination is switched on in a step 1013 and in the step 1015 a picture is taken and from this the present lateral offset is calculated. In a next step 1017 this calculated present lateral offset is compared to the desired lateral offset ($d_{set}$), after which the step 1015 is repeated, in the case where the comparison has given the result that the present offset exceeds the desired one. If the result of the comparison instead is that the present offset is equal to or is lower than the desired one, the electric arc is switched off in a step 1019, whereafter in a step 1021 further pictures are taken of the cooled splice, possibly with a higher optical resolution, and therefrom a value is calculated of the attenuation in the splice, such as by means of the method which has generally been described in our Swedish Patent Application No. 9100979-5, "Optical Fiber Characteristics Analysis", filed Apr. 3, 1991.

Figure 11:
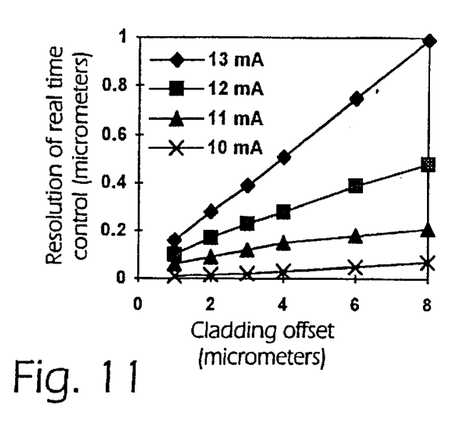
FIG. 11 is a diagram of the resolution for different initial offsets and welding currents.

In FIG. 11 a diagram is shown which on its horizontal axis has the lateral offset of the two exterior surfaces of two fiber ends of a standard fiber from AT&T of type dispersion shifted single-mode-fiber having a cladding diameter of 125 μm. On the vertical axis a quantity is plotted, which indicates the resolution of the procedure for different welding currents. The resolution can here, with reference to what has been said above, be defined as the reduction of the lateral offset, which for a certain current through the electrodes is obtained during some suitably short typical interval, e.g. the time interval, which is required for taking a picture and an image analysis thereof, say 0.3 seconds. For a welding current of 13 mA the resolution is large, e.g. having the magnitude of order of 1 μm for a large initial lateral offset of the sides of the fiber surfaces. For a low welding current of 10 mA or less the control resolution is less than 0.1 μm, but such low values are unsuitable, when a large offset is to be set owing to the very long time which is then required for obtaining a desired lateral offset. A current of 13 mA is also unsuitable, such as has been discussed above, due to among other factors that the optical fiber itself then emits a significant amount of light. In most cases, a current a little below this higher welding current is suitable and thus for instance a welding current of 12 mA has been used practically giving good results.

Figure 12:
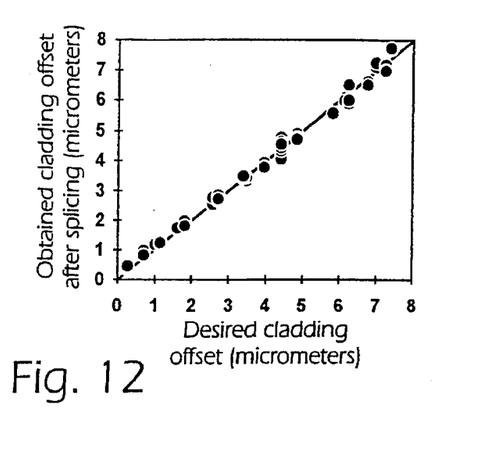
FIG. 12 is a diagram of obtained lateral offset for different set, desired offsets in practically performed tests using a modified standard splicing device, FIG. 13 schematically shows a test arrangement for measuring attenuation obtained in a fiber splice.

In FIG. 12 a diagram is shown, illustrating to some extent the accuracy of the method. Here, on the horizontal axis the desired lateral offset of the surfaces of the fiber ends is plotted in the unit μm, and on the vertical axis the obtained measured real offset is plotted in the same units. It appears from the diagram, that the method which is shown here for control currents in the range of 10–12 mA, in most cases gives good results.

Application areas for the described procedure for obtaining a predetermined offset of exterior surfaces or cladding surfaces of two optical fiber ends are, as has been mentioned above: the manufacture of attenuation elements integrated in optical fiber systems, splicing fibers having eccentrically placed cores, also D-fibers being counted in this category, splicing of a conventional optical fiber having a single core to an optical fiber having double cores. The procedure is in many cases less suitable for splicing optical fibers of standard type with an alignment of the cores to each other due to the long adaption times which are required, when the offset of the exterior sides of the cladding surfaces is smaller than about 1 to 2 μm. In this case, advantageously the procedure described in the Swedish Patent Application No. 9201235-0 cited above is used where larger currents are applied as pulses.

Figure 13:
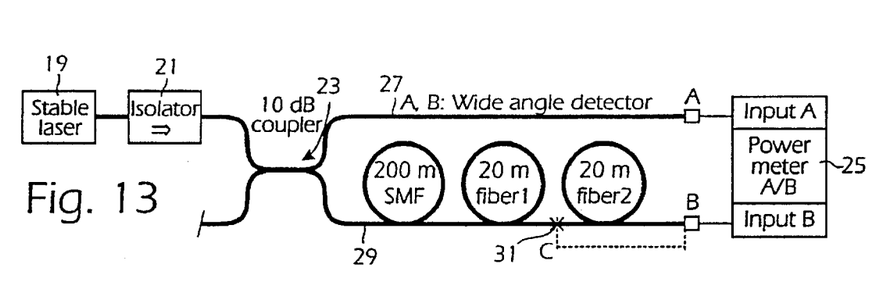
Figure 14:
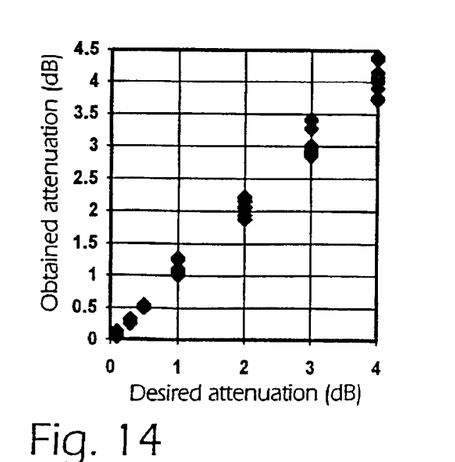
FIG. 14 is a diagram of obtained attenuation as a function of desired attenuation for practically made splices.
Figure 15:
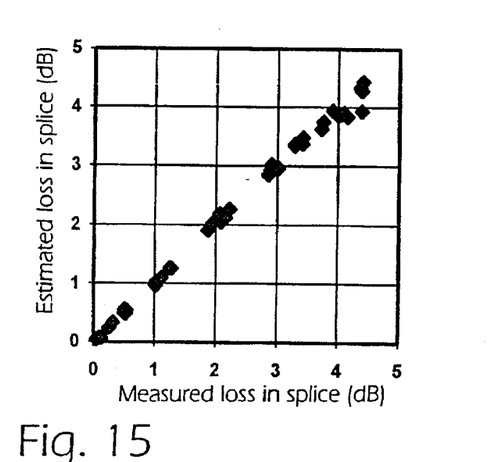
FIG. 15 is a diagram of estimated loss in a splice as a function of measured loss in the splice for splices produced by means of a modified conventional automatic fiber splicing device.

As an example of the procedure described above here a method will be described for obtaining an attenuating component integrated in an optical fiber system. The procedure described above can be performed in an automatic melt fusioning device by modification of the control programs existing therein. First, thus a desired attenuation is determined and hereby, a suitable initial offset ($d_2$) can be estimated by means of calculation methods for estimation of attenuation in a fiber splice based on mode coupling theory, see the Swedish patent application 9100979-5 cited above. Then the procedure is performed as the description above. In a practical example the same fiber type from AT&T as has been mentioned above was used, having a concentricity error of 0.3 μm for the core 3 in relation to the exterior surface of the cladding. Attenuation elements having different desired values of the attenuation were produced by means of the procedure described above and the obtained attenuation of the fiber splice was measured by means of a standard configuration according to FIG. 13. From a light source such as a stable laser 19 light is emitted having a suitable wave length in an optical fiber through an isolator 21 to an optical coupler 23, where the light is split and is made to pass through two different fiber pieces to two different inputs of a light power meter 25. In the first branch 27, connected to a first input of the light detector 25 an optical reference fiber is used of the same type as the one mentioned above but without any splice therein. In the other branch 29, which has the same length as the first branch 27, there is instead an offset splice 31, which has been made according to the method described above. Hereby the attenuation in the offset fiber splice can be determined with a high accuracy. The values of desired attenuation and the obtained attenuation as measured by means of the device in FIG. 13 or the real attenuation are plotted in the diagram of FIG. 14 in the unit decibel. By means of the same test device also the measured loss in the splice in decibel is obtained and it is entered in the diagram of FIG. 15, where on the vertical axis the calculated or estimated loss in the fiber splice is plotted. The diagrams of FIGS. 14 and 15 show good correlations between desired and obtained values.

What is claimed is:

1. A device for splicing two ends of optical fibers, comprising:

means for retaining the ends with their longitudinal directions substantially parallel to each other and for displacing the ends, maintaining a substantially parallel condition;

means for applying heat, such that the outermost regions of the ends retained by the retaining and displacement means can be displaced by the retaining and displacement means, control means for activating the retaining and displacement means to place the end surfaces of the ends retained by the retaining and displacement means opposite each other and at or engaging each other in the center of the region to which heat can be applied by the heat applying means; for controlling the retaining and displacement means to place the outermost regions of the ends with a predetermined lateral offset so that, as seen in a selected direction substantially perpendicular to the longitudinal direction of the ends, the exterior sides of the outermost regions of the ends deviate from being aligned with each other by a predetermined initial value; for activating the heat applying means to apply heat having a high intensity to the outermost regions of the ends for forming a fusion splice; for activating the heat applying means to apply heat with a low intensity which is insufficient for forming a fusion splice until a value by which the exterior sides of the outermost regions of the ends deviate from being aligned with each other is equal to or less than a predetermined final value, which is smaller than the predetermined initial value; for discontinuing applying heat so that the heated outermost regions are allowed to cool; and for determining lateral offset of the exterior sides of the outermost regions of the ends, as seen in at least one selected direction substantially perpendicular to the longitudinal direction of the ends, including means for taking a picture, as seen in the selected direction, and means for evaluating this picture and thereby determining the offset.

2. A device for splicing two ends of optical fibers, comprising:

means for retaining the ends with their longitudinal directions substantially parallel to each other and for displacing the ends, maintaining a substantially parallel condition;

means for applying heat, such that the outermost regions of the ends retained by the retaining and displacement means can be displaced by the retaining and displacement means, control means for activating the retaining and displacement means to place the end surfaces of the ends retained by the retaining and displacement means opposite each other and at or engaging each other in the center of the region to which heat can be applied by the heat applying means; for controlling the retaining and displacement means to place the outermost regions of the ends with a predetermined lateral offset so that, as seen in a selected direction substantially perpendicular to the longitudinal direction of the ends, the exterior sides of the outermost regions of the ends deviate from being aligned with each other by a predetermined initial value; for activating the heat applying means to apply heat having a high intensity to the outermost regions of the ends for forming a fusion splice; for activating the heat applying means to apply heat with a low intensity which is insufficient for forming a fusion splice until a value by which the exterior sides of the outermost regions of the ends deviate from being aligned with each other is equal to or less than a predetermined final value, which is smaller than the predetermined initial value; and for discontinuing applying heat so that the heated outermost regions are allowed to cool.

3. The device of claim 2, wherein the control means comprises means for determining lateral offset of the exterior sides of the outermost regions of the ends, as seen in at least one selected direction substantially perpendicular to the longitudinal direction of the ends.

4. A method of splicing ends of optical fibers, comprising the steps of:

placing the ends with their longitudinal directions parallel to each other;

placing end surfaces of the optical fibers opposite each other and at or engaging each other, wherein the end surfaces of the fibers are placed laterally offset so that, as viewed in a selected direction substantially perpendicular to the longitudinal direction of the ends, exterior sides of the ends deviate from being aligned with each other by a predetermined initial value;

applying heat to outermost regions of the ends, the heat having a high intensity to melt these regions for forming a fusion splice;

immediately after applying heat with the high intensity, applying heat with a lower intensity which is insufficient for forming a fusion splice, and while applying heat with the lower intensity, observing the ends as viewed in the selected direction, determining a value by which the exterior sides of the ends deviate from being aligned with each other, and discontinuing applying heat when the determined value is lower than a predetermined final value, which is smaller than the predetermined initial value; and allowing the outermost regions to cool.

5. The method of claim 4, wherein the predetermined final value is selected so that the offset after cooling the ends in a finished splice gives a predetermined attenuation of a light wave transmitted in the optical fibers and passing through the splice.

6. The method of claim 4, further comprising steps for manufacturing a splice having a predetermined attenuation to be used as an optical attenuation element, wherein a first lateral offset is calculated which gives the predetermined attenuation in a produced splice and which is the predetermined final value, and this value is increased by a small quantity in order to give the predetermined initial value.

* * * * *